United States Patent
Lee et al.

(10) Patent No.: US 11,763,058 B2
(45) Date of Patent: Sep. 19, 2023

(54) METHOD AND COMPUTING DEVICE FOR MANUFACTURING SEMICONDUCTOR DEVICE

(71) Applicant: Samsung Electronics Co., Ltd., Suwon-si (KR)

(72) Inventors: Sooyong Lee, Yongin-si (KR); Jeeyong Lee, Anyang-si (KR); Jaeho Jeong, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 41 days.

(21) Appl. No.: 17/112,048

(22) Filed: Dec. 4, 2020

(65) Prior Publication Data

US 2021/0334444 A1    Oct. 28, 2021

(30) Foreign Application Priority Data

Apr. 28, 2020   (KR) .................. 10-2020-0051761

(51) Int. Cl.
| | |
|---|---|
| *G06F 30/392* | (2020.01) |
| *G06N 20/00* | (2019.01) |
| *G03F 7/00* | (2006.01) |
| *G06N 5/04* | (2023.01) |
| *G06F 119/18* | (2020.01) |

(52) U.S. Cl.
CPC ........ *G06F 30/392* (2020.01); *G03F 7/70441* (2013.01); *G06N 5/04* (2013.01); *G06N 20/00* (2019.01); *G06F 2119/18* (2020.01)

(58) Field of Classification Search
CPC .... G06F 30/392; G06F 2119/18; G06F 30/27; G06F 30/398; G03F 7/70441; G03F 1/36; G03F 7/705; G06N 5/04; G06N 20/00; H01L 21/67276; H01L 22/12; G06T 7/001; G06T 7/11; G06T 2207/20081; G06T 2207/30148
See application file for complete search history.

(56) References Cited

U.S. PATENT DOCUMENTS

| | | | |
|---|---|---|---|
| 8,161,421 B2 | 4/2012 | Viswanathan et al. | |
| 8,495,529 B2 | 7/2013 | van Den Broeke et al. | |
| 8,910,098 B1 * | 12/2014 | Lei | G03F 1/36 |
| | | | 716/51 |
| 9,747,401 B2 | 8/2017 | Hamouda | |
| 10,222,690 B2 | 3/2019 | Jeong | |
| 10,386,713 B2 | 8/2019 | Jeong | |
| 10,387,608 B2 | 8/2019 | Adel et al. | |
| 10,402,524 B2 | 9/2019 | Cao et al. | |
| 10,585,347 B2 | 3/2020 | Sriraman et al. | |
| 2016/0306914 A1 * | 10/2016 | Kang | G03F 7/70433 |

(Continued)

FOREIGN PATENT DOCUMENTS

KR   10-2017-0143445 A   12/2017

*Primary Examiner* — Nha T Nguyen
(74) *Attorney, Agent, or Firm* — Harness, Dickey & Pierce, P.L.C.

(57) ABSTRACT

Disclosed is a method for fabricating of a semiconductor device. The method includes receiving a first layout including patterns for the fabrication of the semiconductor device, performing machine learning-based process proximity correction (PPC) based on features of the patterns of the first layout to generate a second layout, and performing optical proximity correction (OPC) on the second layout to generate a third layout.

15 Claims, 14 Drawing Sheets

(56) References Cited

U.S. PATENT DOCUMENTS

| 2019/0325103 | A1  | 10/2019 | Baidya et al. |              |
|--------------|-----|---------|---------------|--------------|
| 2020/0004918 | A1* | 1/2020  | Sha           | G03F 7/705   |
| 2020/0133117 | A1* | 4/2020  | Chu           | G03F 1/22    |
| 2020/0356013 | A1* | 11/2020 | Van Dongen    | G03F 7/70525 |

* cited by examiner

METHOD AND COMPUTING DEVICE FOR MANUFACTURING SEMICONDUCTOR DEVICE

CROSS-REFERENCE TO RELATED APPLICATIONS

This application claims priority under 35 U.S.C. § 119 to Korean Patent Application No. 10-2020-0051761 filed on Apr. 28, 2020, in the Korean Intellectual Property Office, the contents of which are incorporated by reference herein in their entireties.

BACKGROUND

Some example embodiments of inventive concepts relate to a semiconductor device, and more particularly, relate to a method and/or a computing device for generating a layout for manufacturing of a semiconductor device having improved accuracy.

A semiconductor process for manufacturing a semiconductor device is implemented by a combination of various procedures such as etching, depositing, planarization, growth such as epitaxial growth, implantation, etc. The etching may be performed by forming a pattern of a photo resist on a target and removing portions of the target which are not covered by the photo resist, by using chemicals such as wet chemicals including acids, gases such as dry gases, plasma, ion beams, etc.

A process error may occur due to various factors in the process of performing the etching. The factors causing the process error may come from/result a characteristic of the process and/or may come from a characteristic of the photo resist and/or a characteristic of a semiconductor pattern implemented by the etching. The process error that comes from the characteristic of the pattern may be corrected by revising or changing a layout of patterns.

As a semiconductor device is highly integrated and a nano-scale manufacturing technology is applied to a semiconductor process, the number of patterns included in a semiconductor layout is sharply increasing. Accordingly, the amount of computation for revising/changing a layout of patterns may also sharply increase to correct a process error.

SUMMARY

Example embodiments of inventive concepts provide a method and/or a computing device for generating a layout for manufacturing/fabrication of a semiconductor device, such as semiconductor chip, having improved reliability and/or reduced amount of computation.

According to some example embodiments, a method for fabricating of a semiconductor device includes receiving a first layout including patterns for the fabrication of the semiconductor device, performing machine learning-based process proximity correction (PPC) based on features of the patterns of the first layout to generate a second layout, and performing optical proximity correction (OPC) on the second layout to generate a third layout.

According to some example embodiments, a method for fabricating of a semiconductor device includes receiving an image of a first layout including patterns for the fabrication of the semiconductor device, dividing the image of the first layout to generate grids, extracting features of the grids, and performing a machine learning-based inference on the features to generate an image of after cleaning inspection (ACI).

According to some example embodiments, a computing device includes processors. At least one processor of the processors is configured to execute machine-readable instructions that, when executed by the at least one processor, causes the computing device to perform generation of a layout for manufacturing of a semiconductor device. The generation of the layout for the manufacturing of the semiconductor device includes receiving a first layout including patterns for the manufacturing of the semiconductor device, performing machine learning-based process proximity correction (PPC) based on features of the patterns of the first layout to generate a second layout, and performing optical proximity correction (OPC) on the second layout to generate the layout.

BRIEF DESCRIPTION OF THE FIGURES

The above and other objects and features of the inventive concept will become apparent by describing in detail example embodiments thereof with reference to the accompanying drawings.

DETAILED DESCRIPTION

Below, some example embodiments of inventive concepts may be described in detail and clearly to such an extent that an ordinary one in the art easily implements inventive concepts.

Figure 1:
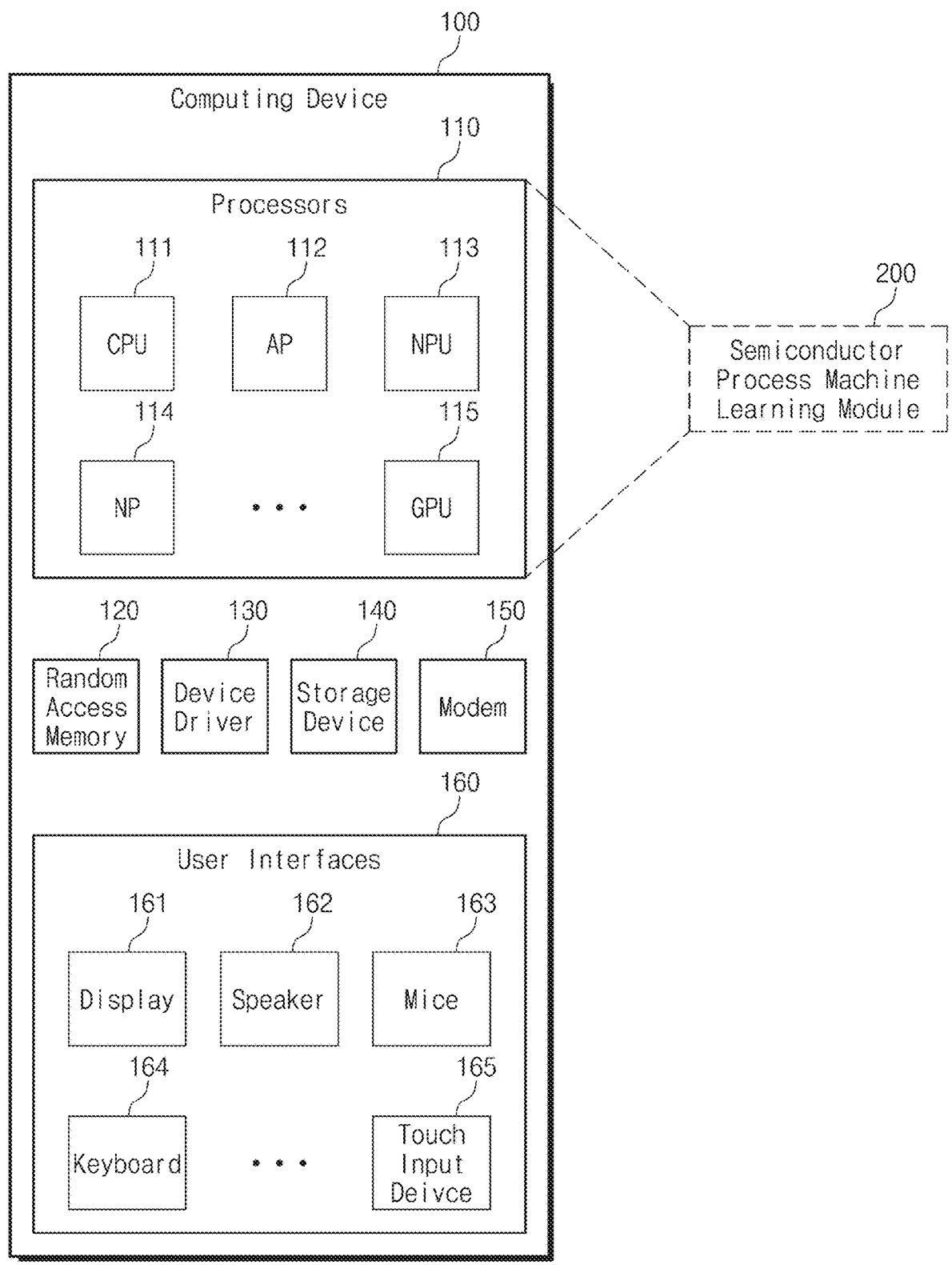
FIG. 1 is a block diagram illustrating a computing device according to some example embodiments of inventive concept.

FIG. 1 is a block diagram illustrating a computing device 100 according to some example embodiments of inventive concepts. Referring to FIG. 1, the computing device 100 may include one or more processors 110, a random access memory 120, one or more device drivers 130, one or more storage devices 140, one or more modem 150, and one or more user interfaces 160.

At least one of the processors 110 may execute a semiconductor process machine learning module 200. The semiconductor process machine learning module 200 may perform generation of a layout for manufacturing of a semiconductor device, based on the machine learning. For example, the semiconductor process machine learning module 200 may be implemented in the form of instructions (and/or codes) that are executed by at least one of the processors 110. In this case, the at least one processor may load the instructions (or codes) of the semiconductor process machine learning module 200 onto the random access memory 120.

Alternatively or additionally, the at least one processor may be configured to implement the semiconductor process machine learning module 200. For another example, the at least one processor may be configured to implement various machine learning modules. The at least one processor may implement the semiconductor process machine learning module 200 by receiving information corresponding to the semiconductor process machine learning module 200.

The processors 110 may include, for example, at least one general-purpose processor such as a central processing unit (CPU) 111 and/or an application processor (AP) 112. Alternatively or additionally, the processors 110 may further include at least one special-purpose processor such as a neural processing unit (NPU) 113, a neuromorphic processor (NP) 114, or a graphics processing unit (GPU) 115. The processors 110 may include two or more homogeneous processors.

The random access memory 120 may be used as a working memory of the processors 110 and may be used as a main memory or a system memory of the computing device 100. The random access memory 120 may include a volatile memory such as a dynamic random access memory and/or a static random access memory, or a nonvolatile memory such as a phase-change random access memory, a ferroelectric random access memory, a magnetic random access memory, and/or a resistive random access memory.

The device driver 130 may control the following peripheral devices depending on a request of at least one of the processors 110: the storage device 140, the modem 150, and the user interfaces 160. The storage device 140 may include a stationary storage device such as a hard disk drive or a solid state drive, and/or a attachable and detachable storage device such as an external hard disk drive, an external solid state drive, and/or a attachable and detachable memory card.

The modem 150 may provide remote communication with an external device. The modem 150 may perform wired or wireless communication with the external device. The modem 150 may communicate with the external device based on at least one of various communication schemes such as Ethernet, wireless-fidelity (Wi-Fi), long term evolution (LTE), and 5$^{th}$ generation (5G) mobile communication.

The user interfaces 160 may receive information from a user and may provide information to the user. The user interfaces 160 may include at least one user output interface such as a display 161 or a speaker 162, and at least one user input interface such as mice 163, a keyboard 164, or a touch input device 165.

The instructions (e.g. codes) of the semiconductor process machine learning module 200 may be received through the modem 150 and may be stored in the storage device 140.

The instructions (e.g. codes) of the semiconductor process machine learning module 200 may be stored in a attachable and detachable storage device, and the attachable and detachable storage device may be connected with the computing device 100. The instructions (e.g. codes) of the semiconductor process machine learning module 200 may be loaded from the storage device 140 onto the random access memory 120 and may be executed on the random access memory 120.

Figure 2:
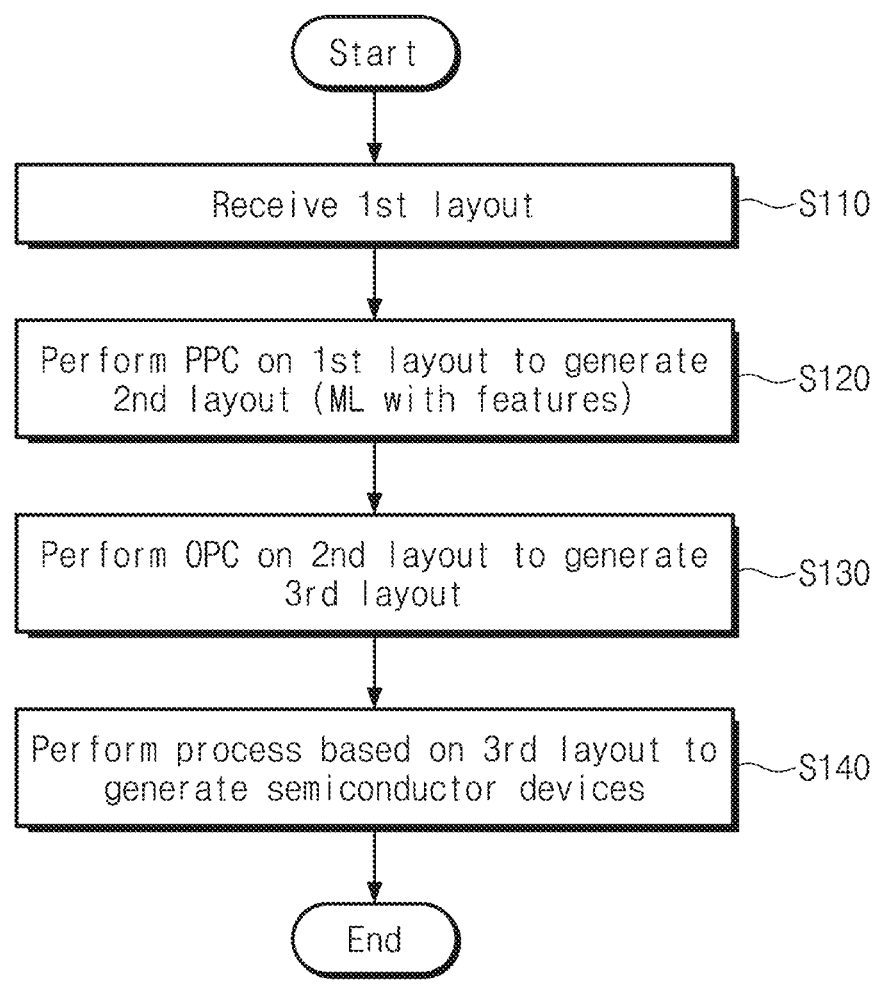
FIG. 2 illustrates an example in which a semiconductor process machine learning module of FIG. 1 performs generation of a layout.

FIG. 2 illustrates an example in which the semiconductor process machine learning module 200 of FIG. 1 performs generation of a layout. Referring to FIGS. 1 and 2, in operation S110, the semiconductor process machine learning module 200 may receive a first layout. For example, the first layout may be a target layout that an operator/technician/engineer wants to or intends to obtain in ACI (after cleaning inspection). Layouts such as first layout, second layout, third layout, etc. may be or correspond to a two-dimensional layout of patterns associated with one or more layers of the semiconductor device to be fabricated.

In operation S120, the semiconductor process machine learning module 200 may perform process proximity correction (PPC) on the first layout to generate a second layout. The process proximity correction may be made by performing a machine learning-based inference on features of patterns of the first layout. The second layout may be a target layout of a photo resist, which the operator/technician/engineer wants to or intends to obtain in ADI (after development inspection).

The process proximity correction may correct a change in a shape of a semiconductor pattern due to an influence of characteristics of patterns and an influence of an etch skew, when performing etching. For example, the process proximity correction may in advance correct the change in the shape in etching by in advance deforming a shape of a portion of a specific pattern, at which the change of the shape is expected, and by applying the deformed result to a layout.

In operation S130, the semiconductor process machine learning module 200 may perform optical proximity correction (OPC) on the second layout to generate a third layout. The third layout may be or correspond to a layout of a photo mask, and may be transferred to the photo mask for mask-writing (not illustrated).

The optical proximity correction may correct a change in a shape of a photo resist due to an influence of characteristics of patterns and an influence of a skew, when generating the patterns of the photo resist. For example, the optical proximity correction may in advance correct the change in the shape in etching by in advance deforming a shape of a portion of a specific pattern, at which the change of the shape is expected, and applying the deformed result to a layout. The optical proximity correction may adjust the shape of polygons on the layout by adding or removing serifs and/or adding or removing inriggers or outriggers and/or other sub-resolution assist features (SRAF's)s; however, example embodiments are not limited thereto.

In operation S140, semiconductor devices may be generated (or manufactured or fabricated) based on the third layout. For example, patterns of a photo resist may be generated on a target (e.g., a target of a semiconductor process to be manufactured as a semiconductor device) by using the photo mask of the third layout. Exposed portions of the target, which are not covered by the patterns of the photo resist, may be removed through the etching. Afterwards, the etching process may be completed by removing the photo resist. A photolithography process may be or include a process such as an Extreme Ultraviolet (EUV)

process, an immersion lithography process, etc.; however, example embodiments are not limited thereto.

Figure 3:
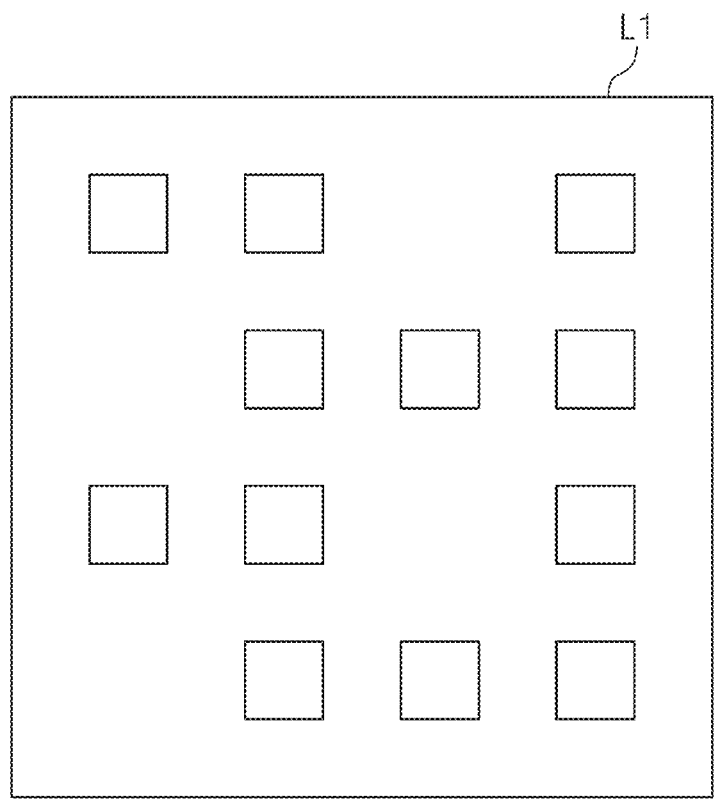
FIG. 3 illustrates an example of a first layout.

FIG. 3 illustrates an example of a first layout L1. Referring to FIGS. 2 and 3, the first layout L1 may include polygons such as quadrangular patterns. For example, the quadrangular patterns may be patterns of vias and/or contacts. For example, the first layout L1 may be a layout for generating vias and/or contacts. The first layout L1 may be a target layout that the operator/technician/engineer intends to obtain in the ACI (after cleaning inspection). Although FIG. 3 illustrates that each of the quadrilaterals are the same size, example embodiments are not limited thereto.

Figure 4:
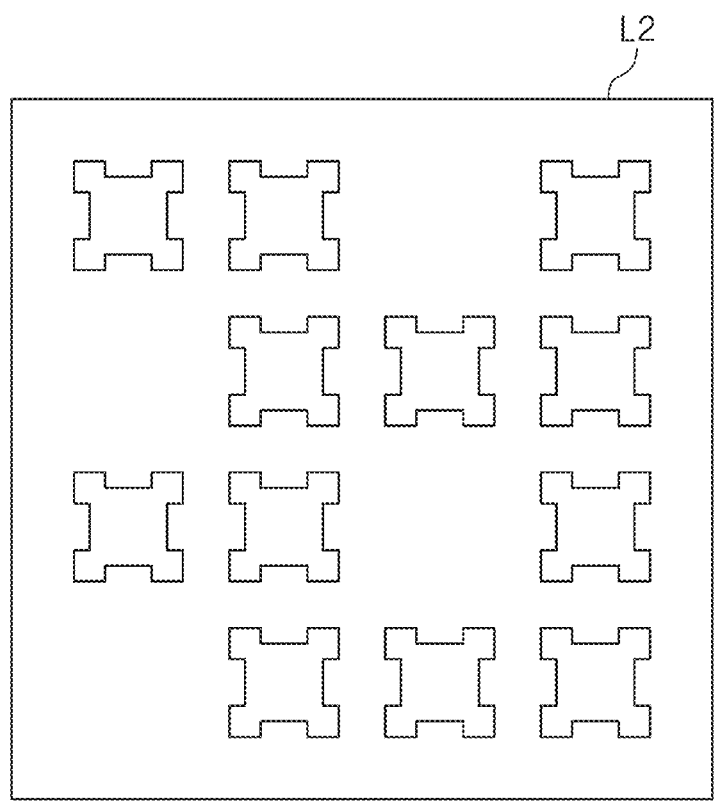
FIG. 4 illustrates an example of a second layout.

FIG. 4 illustrates an example of a second layout L2. Referring to FIGS. 3 and 4, patterns of the second layout L2 of FIG. 4 may have shapes deformed from the patterns of the first layout L1 of FIG. 3. The second layout L2 may be a target layout that the operator/technician/engineer intends to obtain in the ADI (after development inspection).

An example is illustrated in FIGS. 3 and 4 as patterns are revised in the same shape and manner. However, this example is only for conveying the technical idea of inventive concept easily. Patterns may be revised in different shapes and/or manner.

Figure 5:
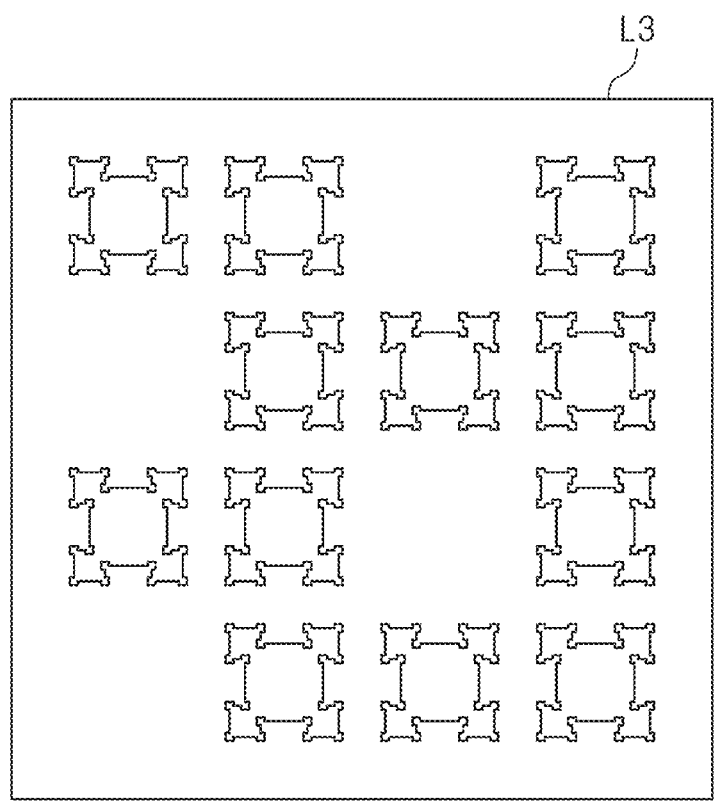
FIG. 5 illustrates an example of a third layout.

FIG. 5 illustrates an example of a third layout L3. Referring to FIGS. 4 and 5, patterns of the third layout L3 of FIG. 5 may have shapes deformed from the patterns of the second layout L2 of FIG. 4. The third layout L3 may be or correspond to a layout of a photo mask, and may be written to the photo mask during a mask-write operation (not illustrated).

An example is illustrated in FIGS. 4 and 5 as patterns are revised in the same shape. However, this example is only for conveying the technical idea of inventive concept easily. Patterns may be revised in different shapes and/or manners.

The process of generating the second layout L2 of FIG. 4 from the first layout L1 of FIG. 3 may be or include the process proximity correction (PPC). In some example embodiments, the PPC may be performed based on a rule. The rule-based PPC may depend on information of edges of patterns, such as a width and a space.

Alternatively or additionally, the PPC may be performed based on a model. The model-based PPC may be performed by using a pixel-based image of a layout. The model-based PPC may predict a critical dimension (CD) based on a result of processing an image and may perform correction based on the prediction result. The CD may be an ACI CD corresponding to a measurement of one or more distances between separate polygons, and/or one or more distances within a polygon.

The rule-based PPC performs computations, the amount of which is less than that of the model-based PPC. However, because the rule-based PPC uses information, the amount of which is less than the model-based PPC, the accuracy of the rule-based PPC may be less than the accuracy of the model-based PPC. In contrast, in computing the model-based PPC may use information, the amount of which is more than the rule-based PPC. Thus, the accuracy of the model-based PPC may be higher than the accuracy of the rule-based PPC. However, the amount of computation of the model-based PPC may be more than the amount of computation of the rule-based PPC.

The semiconductor process machine learning module 200 according to some example embodiments of inventive concepts may perform the PPC having improved accuracy and/or a reduced amount of computation by performing a machine learning-based inference based on features of patterns of a layout, and the PPC according to some example embodiments may not correspond to either a rule-based PPC or a model-based PPC, and instead may be a feature-based PPC, for example a feature-based PPC based on machine learning.

Figure 6:
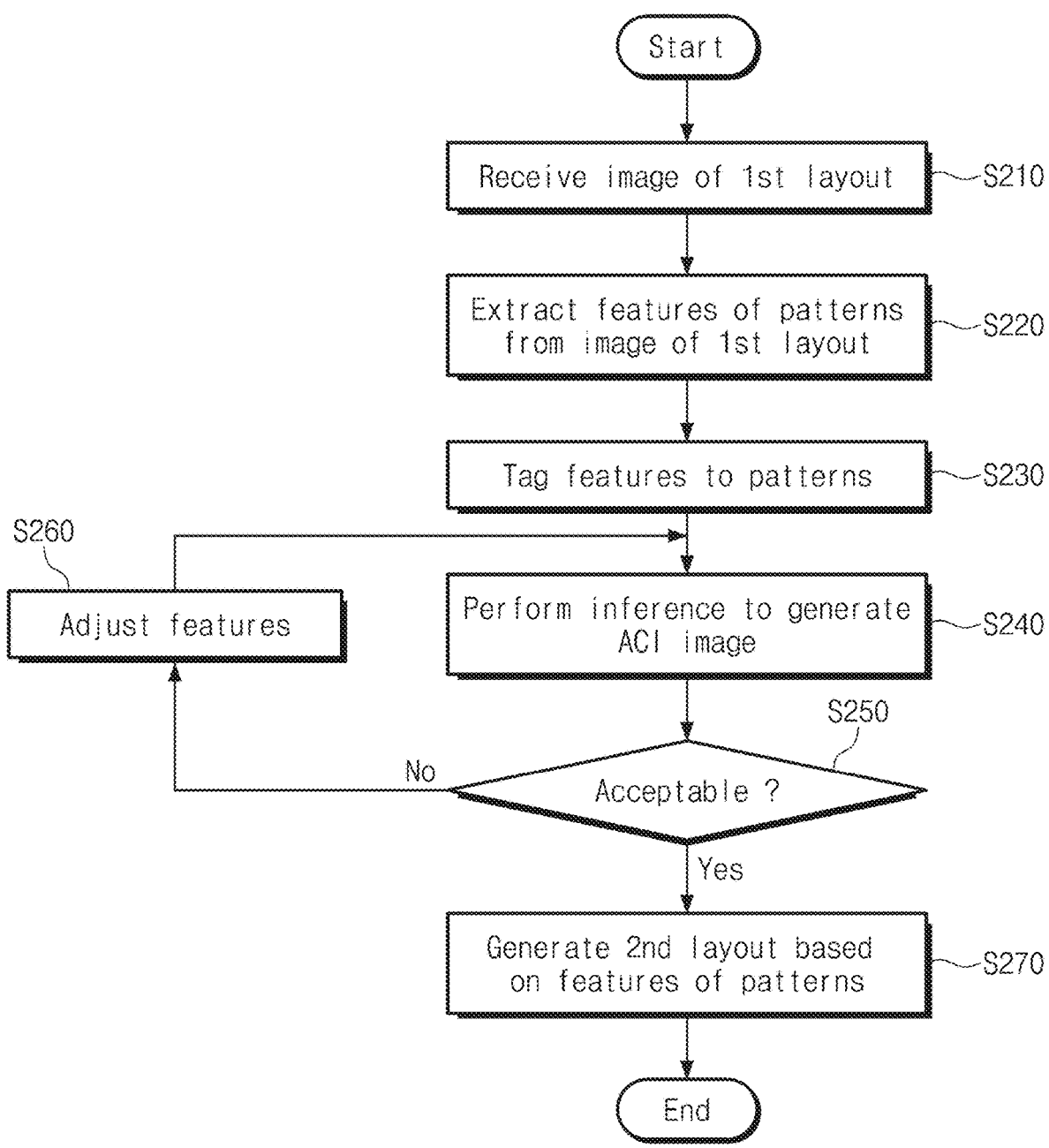
FIG. 6 illustrates an example in which a semiconductor process machine learning module according to some example embodiments of inventive concept executes process proximity correction.

FIG. 6 illustrates an example in which the semiconductor process machine learning module 200 according to some example embodiments of the inventive concept executes process proximity correction. Referring to FIGS. 1, 2, and 6, in operation S210, the semiconductor process machine learning module 200 may receive an image of a first layout. The image of the first layout may include shapes of patterns that the operator intends to obtain in the ACI (after cleaning inspection). The image may be or include an image in a format such as a JPEG format, a PVG format, a TIFF format, etc. Alternatively, they may be in another format such as a proprietary format. However, example embodiments are not limited thereto.

In operation S220, the semiconductor process machine learning module 200 may extract features of patterns from the image of the first layout. For example, the semiconductor process machine learning module 200 may extract one or more features from each of the patterns. The semiconductor process machine learning module 200 may extract features of the same kind and/or features of different kinds, from the patterns.

The features may include a characteristic (e.g., a size and/or a shape) of each of the patterns, along with an influence that each of the patterns experiences in etching from neighboring patterns placed around each pattern. The amount of pieces of information included in the features according to example embodiments may be more than the amount of pieces of information used in the rule-based PPC. Accordingly, the machine learning-based inference (e.g., a feature-based PPC) associated with the features may be more accurate than the rule-based PPC.

The amount of pieces of information included in the features according to example embodiments may be less than the amount of pieces of information used in the model-based PPC. Because the amount of pieces of information decreases, the amount of computation of the feature-based PPC may be less than the amount of computation of the model-based PPC. Alternatively or additionally, because pieces of information close to a noise are removed and pieces of information directly affecting each pattern are applied to the inference, the feature-based PPC according to some example embodiments may be more accurate than the model-based PPC.

In operation S230, the semiconductor process machine learning module 200 may tag the features extracted from each of the patterns on each of the patterns. For example, the influence exerted on each of the patterns in etching may be computerized and may be applied to each of the patterns.

In operation S240, the semiconductor process machine learning module 200 may perform the machine learning-based inference on the features, so as to generate an image of the ACI (after cleaning inspection) which is expected. For example, in a case of generating the first layout, and then using the first layout as an inspection (ADI) image, the semiconductor process machine learning module 200 may infer an ACI image that is expected. The format of the image of the ACI may be a generic and/or proprietary format; however, example embodiments are not limited thereto.

In operation S250, the semiconductor process machine learning module 200 may determine whether the inferred ACI image is acceptable. For example, when a difference between the inferred ACI image and a target ACI image (e.g., the image of the first layout) is greater than a threshold, the semiconductor process machine learning module 200 may determine the inferred ACI image as being not acceptable. The difference may be measured based on, for example, a root-mean-squared calculation; however, example embodiments are not limited thereto.

When the inferred ACI image is not acceptable, in operation S260 the semiconductor process machine learning module 200 may adjust the features. For example, the semiconductor process machine learning module 200 may adjust patterns' own features such as sizes and/or shapes of the patterns. As the patterns' own features are adjusted, features of an influence that the patterns exert on neighboring patterns may also be updated.

In some example embodiments, the adjustment of the features may also be performed by the machine learning-based inference. The semiconductor process machine learning module 200 may perform the machine learning-based inference on the difference between the inferred ACI image and the target ACI image and may determine adjustment values of the features. For example, the semiconductor process machine learning module 200 may perform an inference for each of the patterns, for each image, and/or for each group of patterns.

Afterwards, in operation S240, the semiconductor process machine learning module 200 may perform the machine learning-based inference on the adjusted features and may generate an ACI image that is expected. The semiconductor process machine learning module 200 may repeat operation S240 to S260 until the difference between the inferred ACI image and the target ACI image is the threshold or less, that is, until the inferred ACI image is acceptable.

When the inferred ACI image is acceptable, in operation S270, the semiconductor process machine learning module 200 may generate a second image, for example, an ADI image based on the features of the patterns. The semiconductor process machine learning module 200 may generate the second image from the features of the acceptable patterns.

In operation S260 where the features are adjusted, patterns' own features such as sizes and/or shapes of the patterns are adjusted. Accordingly, the second image may be generated from the target ACI image by revising patterns' own portions such as sizes and shapes of the patterns, based on the adjusted features.

Figure 7:
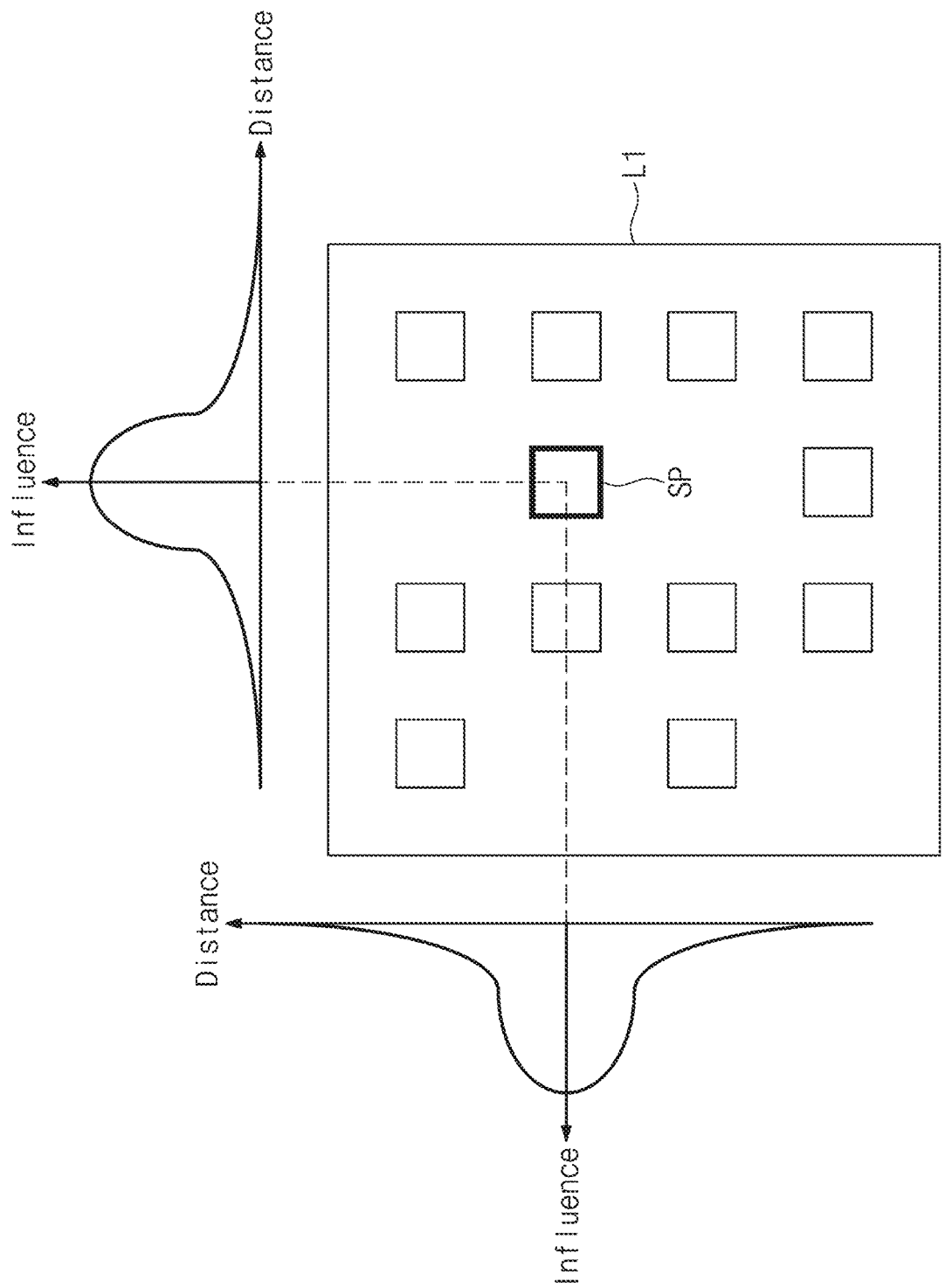
FIG. 7 illustrates a first example of extracting an influence that neighboring patterns exert on a specific pattern as a feature.

FIG. 7 illustrates a first example of extracting an influence that neighboring patterns exert on a specific pattern (e.g., a selected pattern) as a feature. Referring to FIG. 7, a selected pattern SP is marked by a bold line. An influence of neighboring patterns placed around the selected pattern SP, for example, an influence exerted on the selected pattern SP when the neighboring patterns exist may be extracted. For example, the influence of the neighboring patterns may be extracted based on Equation 1 below.

$$\sum_{i \neq i_0 \in R} A_i e^{-(\vec{r}_i - \vec{r}_0)^2 / \sigma^2} \quad \text{[Equation 1]}$$

In Equation 1 above, "R" indicates patterns within a range. The range may be or correspond to a range having an actual influence on the selected pattern SP, and thus, the range may be referred to as an "influence range". A size of the influence range may be smaller than a size of an image of a layout.

In Equation 1 above, "$i_0$" may be or correspond to an identification number of the selected pattern SP. '$\vec{r}_0$' may be or correspond to a position vector of the selected pattern SP, e.g. of a center of the selected pattern SP, on the coordinate system of the image. '$A_i$' may be or correspond to a size and/or a shape of an i-th pattern (i being a positive integer that is 1 or more and is less than the number of "R" (patterns in a range)). '$\vec{r}_i$' may be a position vector of the i-th pattern, e.g. of a center of the i-th pattern, on the coordinate system of the image.

In some example embodiments, the displacement of neighboring patterns may be extracted by a or based on the Gaussian distribution as expressed by Equation 1 above. In Equation 1 above, '$\sigma$' may indicate a weight of the function of the Gaussian distribution, for example, decay. In some example embodiments, the weight of the function of the Gaussian distribution may be determined based on a characteristic of a process, for example, one or more of a temperature, a time, a pitch, a line width, a material, etc.

As a distance from the selected pattern SP increases, an influence of the displacement of the neighboring patterns may decrease based on the function of the Gaussian distribution. As the distance from the selected pattern SP decreases, the influence of the displacement of the neighboring patterns may increase based on the function of the Gaussian distribution. A feature of the displacement of the neighboring patterns may be extracted for each pattern.

Figure 8:
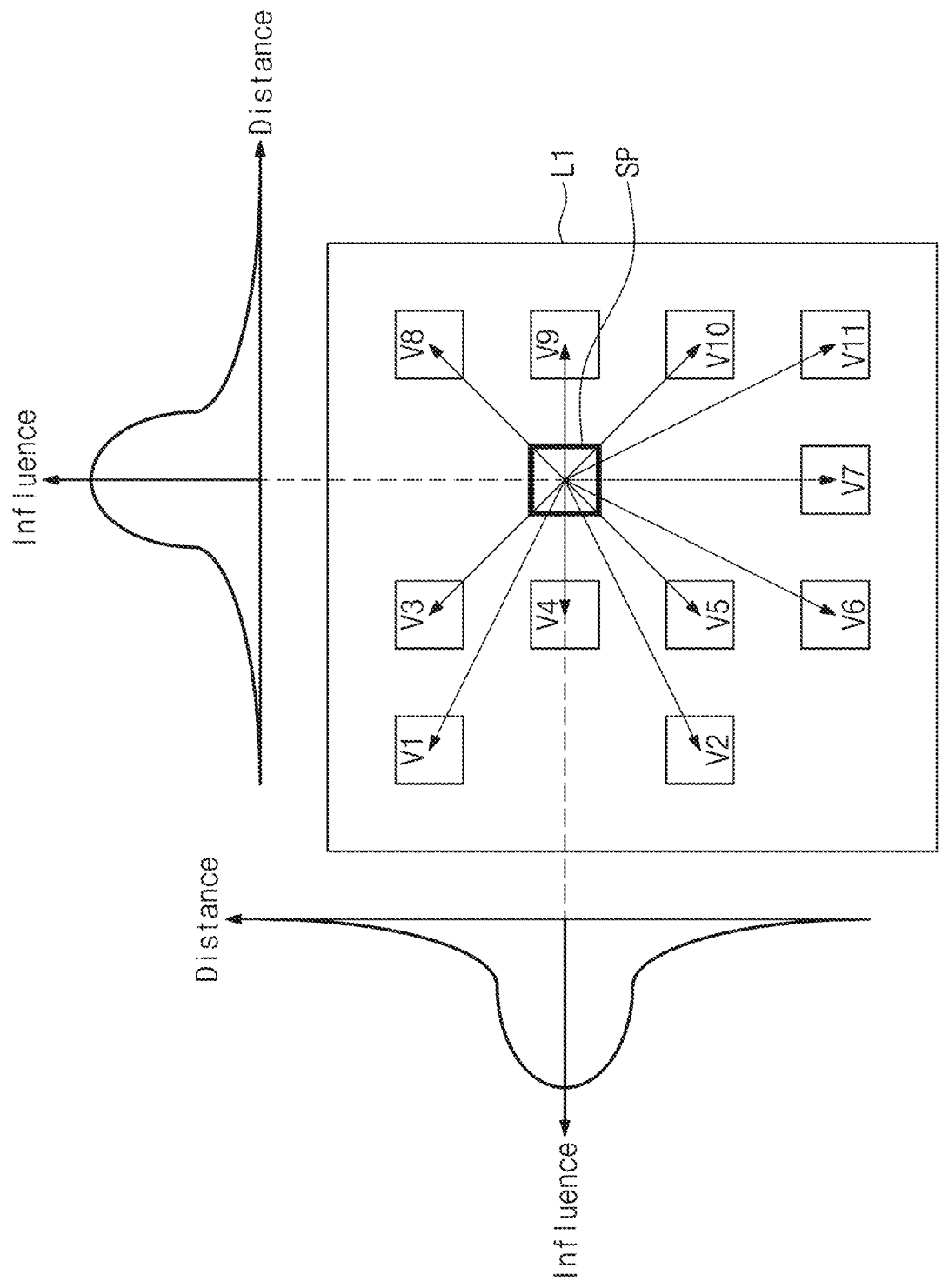
FIGS. 8 and 9 illustrate a second example of extracting an influence that neighboring patterns exert on a specific pattern as a feature.
Figure 9:
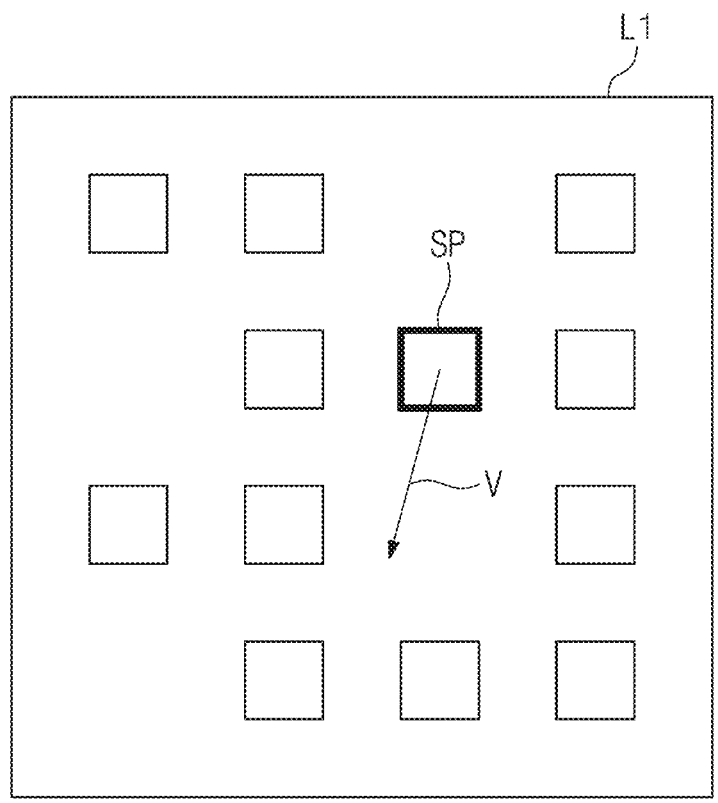

FIGS. 8 and 9 illustrate a second example of extracting an influence that neighboring patterns exert on a specific pattern (e.g., a selected pattern) as a feature. Referring to FIGS. 8 and 9, the selected pattern SP is marked by a bold line. An influence of neighboring patterns placed around the selected pattern SP, for example, an influence of an electric field applied to the neighboring patterns in etching may be extracted. For example, the influence of the electric field of the neighboring patterns may be extracted based on, e.g. based directly on, Equation 2 below.

$$\left| \sum_{i \neq i_0 \in R} A_i e^{-\frac{(\vec{r}_i - \vec{r}_0)^2}{\sigma^2}} \frac{\vec{r}_i}{|\vec{r}_i|} \right|^2 \quad \text{[Equation 2]}$$

Equation 2 above may be or correspond to a sum of position vectors of neighboring patterns placed around the selected pattern SP. Magnitudes of the position vectors of the neighboring patterns may be identified as "1" and may be replaced with a feature of the displacement in Equation 1 above.

In some example embodiments, according to Equation 2 above, a sum of first to eleventh position vectors V1 to V11 may be, for example, a vector "V" of FIG. 9. A magnitude of the vector "V" of FIG. 9 may be extracted from features of the influence of the electric field.

Alternatively or additionally, an influence that the neighboring patterns exert on a skew in etching the selected pattern SP may be extracted based on, e.g. based directly on, Equation 3.

$$\left| \sum_{i \neq i_0 \in R} A_i e^{-(\vec{r}_i - \vec{r}_0)^2 / \sigma^2} e^{i 2(\theta_i - \theta_0)} \right|^2 \quad \text{[Equation 3]}$$

In Equation 3 above, '$\theta_0$' may be or correspond to a phase of the selected pattern SP on the coordinate system of the image, and '$\theta_i$' may be or correspond to a phase of the i-th pattern on the coordinate system of the image. According to Equation 3, a feature of the influence of the skew may be extracted by correcting angle information of position vectors of neighboring patterns placed around the selected pattern SP two times such that harmonics are applied to the displacement characteristic of Equation 1 above.

In some example embodiments, the description is given as angle information is corrected "two times" in Equation 3 above, but angle information may be corrected "m" times (m being a positive integer) based on a characteristic of a process. Also, the feature of the influence of the skew may be extracted by applying not or not just the harmonics but an orthogonal basis function such as Bessel function.

In Equation 1 to Equation 3, the process of extracting features with reference to the polar coordinate system is described. However, the coordinate system on an image for extracting features is not limited to the polar coordinate system, and various coordinate systems such as the Cartesian coordinate system may be used.

Figure 10:
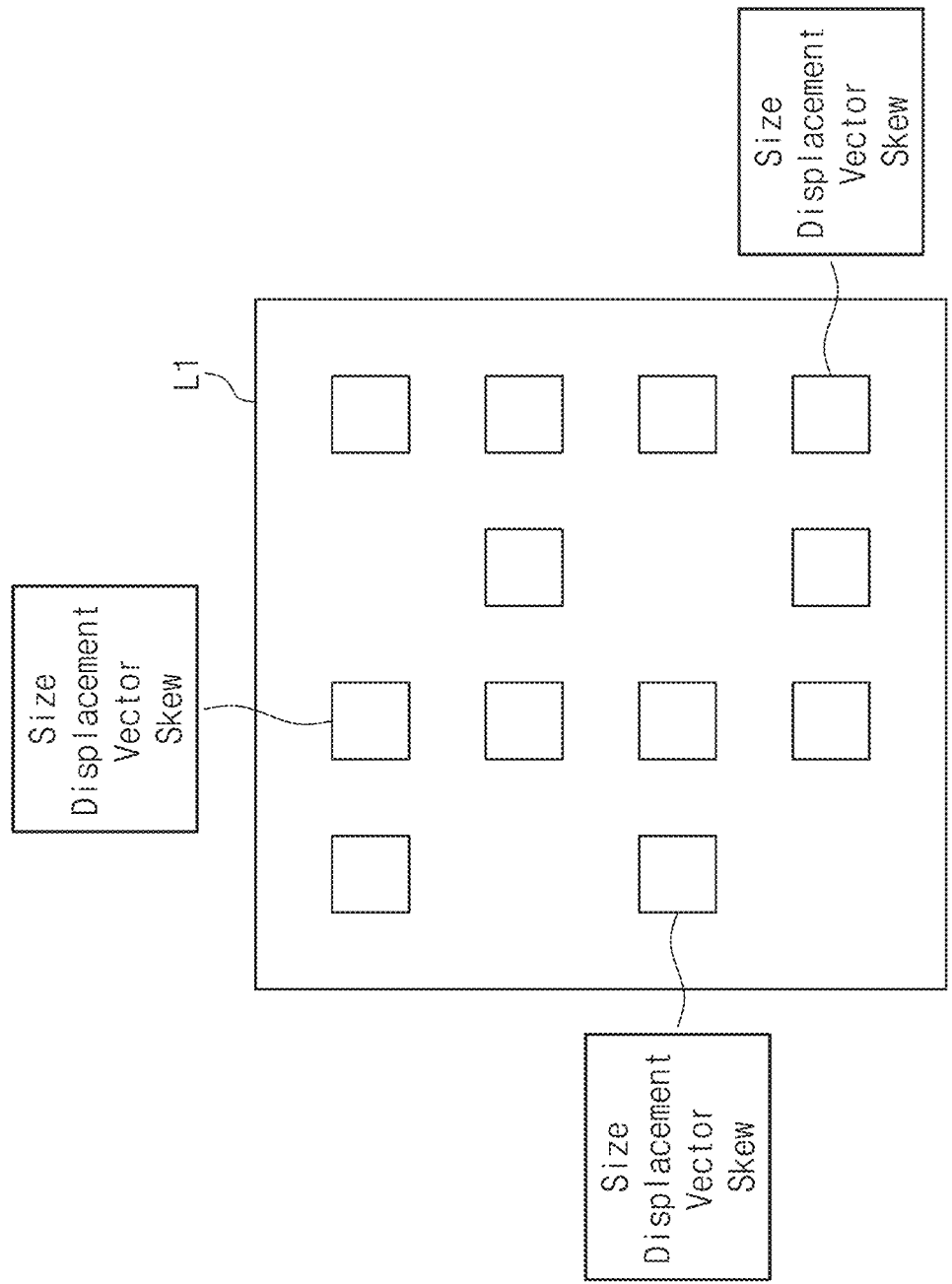
FIG. 10 illustrates an example in which features are tagged on patterns of a first layout.

FIG. 10 illustrates an example in which features are tagged on patterns of the first layout L1. Referring to FIG. 10, a feature of at least one of size and/or a shape, a displacement feature, a vector feature of an electric field, and a skew feature may be tagged on each of patterns. The semiconductor process machine learning module 200 may perform the machine learning-based inference based on the features of the patterns.

Figure 11:
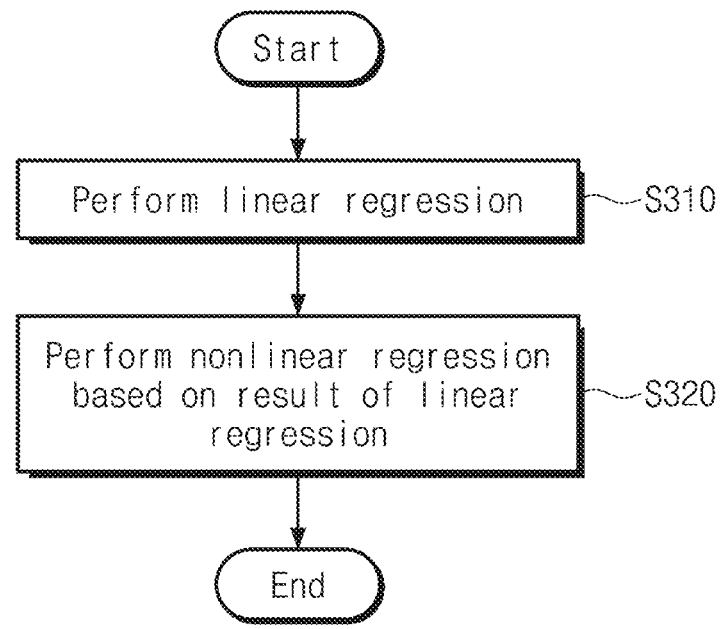
FIG. 11 illustrates an example in which a semiconductor process machine learning module performs a machine learning-based inference.

FIG. 11 illustrates an example in which the semiconductor process machine learning module 200 performs a machine learning-based inference. Referring to FIGS. 1 and 11, in operation S310, the semiconductor process machine learning module 200 may perform a linear regression-based inference. Afterwards, in operation S320, the semiconductor process machine learning module 200 may perform a nonlinear regression-based inference based on a result of the linear regression.

A linear regression-based inference may be characterized in that an inference result is converged on one point. In contrast, results of a nonlinear regression-based inference may exist at or converge onto two or more points. For example, a result of the nonlinear regression-based inference may fluctuate and/or diverge. To prevent or reduce the likelihood that the inference result from fluctuating or diverging, the semiconductor process machine learning module 200 may first perform the linear regression-based inference.

The accuracy of the linear regression-based inference may be lower than the accuracy of the nonlinear regression-based inference. Accordingly, the semiconductor process machine learning module 200 may additionally perform the nonlinear regression-based inference based on a result of the linear regression-based inference. Because the inference starts from the result of the linear regression-based inference, the nonlinear regression-based inference may not fluctuate or diverge and may come close to the most adjacent inference point. Accordingly, the semiconductor process machine learning module 200 may perform the inference with improved accuracy and stability.

Unlike the above linear regression or nonlinear regression or in addition to the above linear regression or nonlinear regression, at least one of various algorithms such as a support vector machine (SVM) and a random forest may be used. The semiconductor process machine learning module 200 according to some example embodiments of inventive concepts may be configured to perform an inference by using two or more algorithms and to execute an ensemble algorithm of selecting a more appropriate one of results of the inference.

In some example embodiments, the methods of FIGS. 6 to 11, in which features are extracted from each pattern and the inference is performed based on the extracted features, may be performed on a short-range image due to a restriction on a computing power. For example, the methods of FIGS. 6 to 11 may be performed on an image that is or corresponds to features that are 1 um wide and 1 um long.

Actually, a unit by which an etching process is performed may be larger than 1 um, e.g. may be several mm or several cm. The short-range image based PPC of FIGS. 6 to 11 may be difficult to apply features occurring in units of several to tens um (in units of a long range).

Figure 12:
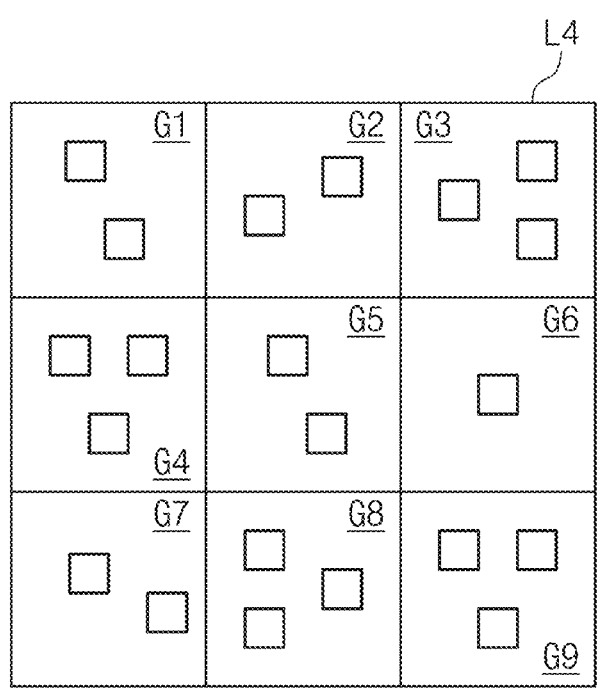
FIG. 12 illustrates an example in which a fourth layout according to some example embodiments of inventive concepts is divided into grids.

FIG. 12 illustrates an example in which a fourth layout L4 according to some example embodiments of inventive concepts is divided into grids. Referring to FIGS. 1 and 12, the fourth layout L4 may be or correspond to a target ACI image. Before inferring an ACI image, the semiconductor process machine learning module 200 may select a long-range area targeted for inference from an image of the fourth layout L4 and may generate grids G1 to G9 by dividing the selected long-range area.

The semiconductor process machine learning module 200 may extract features of each grid as opposed to, or in addition to, features of each pattern. For example, the features of each grid may include a characteristic inherent in each grid (e.g., a size and/or shape of patterns included in each grid or the number (and/or a density) of patterns included in each grid).

The features of each grid may include an influence that is transferred from neighboring grids to each grid. In Equation 1 to Equation 3, the number (and/or a density) of patterns included in each grid may be used instead of or in addition to a size (Ai).

Figure 13:
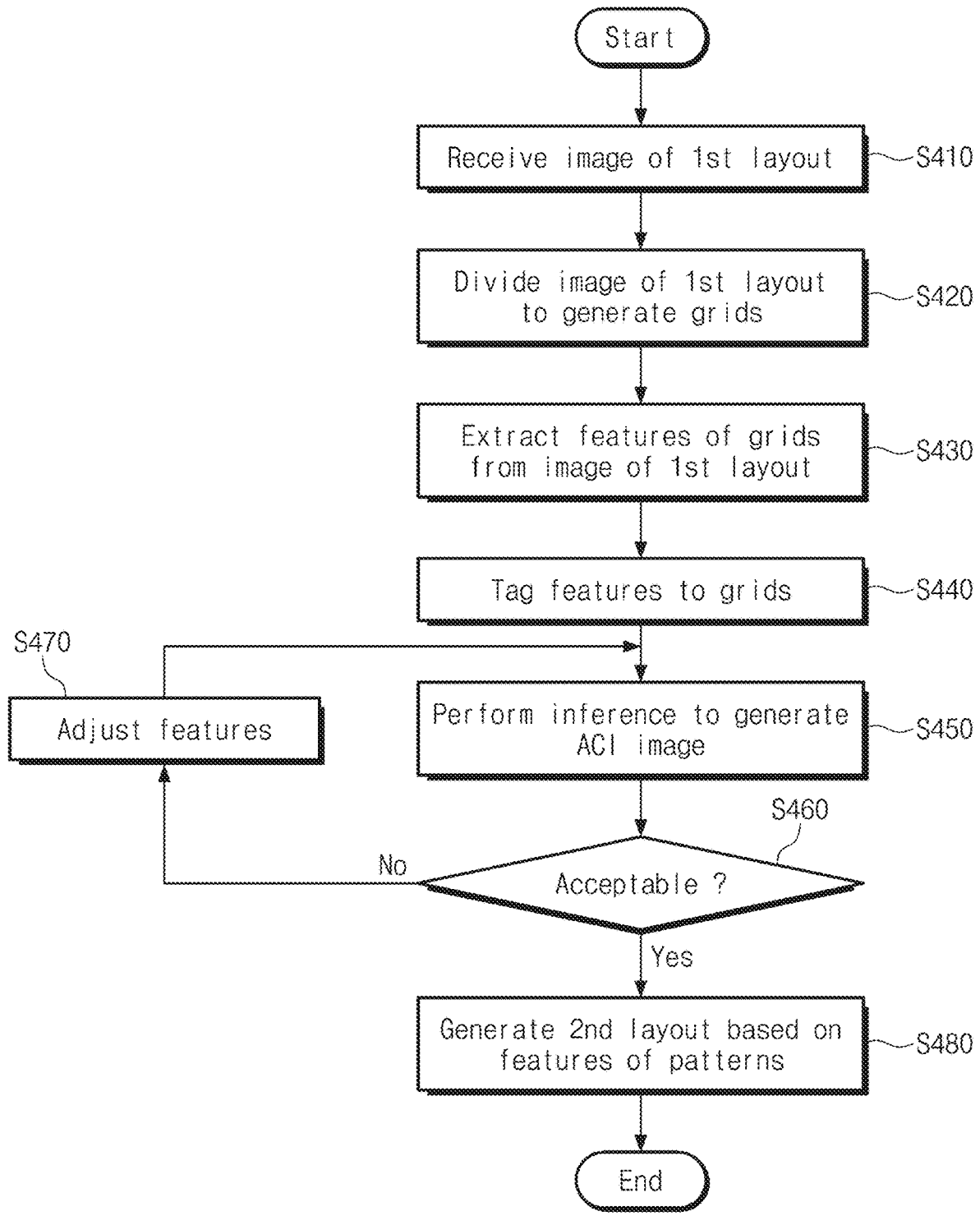
FIG. 13 illustrates an example in which a semiconductor process machine learning module according to some example embodiments of inventive concepts executes process proximity correction at a long range.

FIG. 13 illustrates an example in which the semiconductor process machine learning module 200 according to an embodiment of the inventive concept executes process proximity correction at a long range. Referring to FIGS. 1, 2, and 13, in operation S410, the semiconductor process machine learning module 200 may receive an image of a first layout. The image of the first layout may be a target ACI image.

In operation S420, the semiconductor process machine learning module 200 may divide the image of the first layout to generate grids. In operation S430, the semiconductor process machine learning module 200 may extract features of the grids from the image of the first layout. For example, the semiconductor process machine learning module 200 may extract one or more features from each of the grids.

The semiconductor process machine learning module 200 may extract features of the same kind or features of different kinds, from the grids. The features may include a characteristic (e.g., a size and the number) of patterns included in each grid, and an influence that each of the grids experiences in etching from neighboring grids adjacent thereto.

In operation S440, the semiconductor process machine learning module 200 may tag the features extracted from each of the grids on each of the grids. That is, the influence that is exerted on each of the grids in etching may be computerized and may be applied to each of the grids.

In operation S450, the semiconductor process machine learning module 200 may perform the machine learning-based inference on the features to generate an ACI image that is expected. For example, when the first layout is used as an ADI image, the semiconductor process machine learning module 200 may infer an ACI image that is expected.

In operation S460, the semiconductor process machine learning module 200 may determine whether the inferred ACI image is acceptable. For example, when a difference between the inferred ACI image and a target ACI image (e.g., the image of the first layout) is greater than a threshold, the semiconductor process machine learning module 200 may determine the inferred ACI image as being not acceptable.

When the inferred ACI image is not acceptable, in operation S470, the semiconductor process machine learning module 200 may adjust the features. For example, the semiconductor process machine learning module 200 may adjust patterns' own features such as sizes and shapes of the patterns included in the grids. As the features inherent in the patterns are adjusted, features of an influence that the grids exert on neighboring grids may also be updated.

In an embodiment, the adjustment of the features may also be performed by the machine learning-based inference. The semiconductor process machine learning module 200 may perform the machine learning-based inference on the difference between the inferred ACI image and the target ACI image and may determine adjustment values of the features.

Afterwards, in operation S450, the semiconductor process machine learning module 200 may perform the machine learning-based inference on the adjusted features and may generate an ACI image that is expected. The semiconductor process machine learning module 200 may repeat operation S450 to S470 until the difference between the inferred ACI image and the target ACI image is the threshold or less, that is, until the inferred ACI image is acceptable.

When the inferred ACI image is acceptable, in operation S480, the semiconductor process machine learning module 200 may generate a second image, that is, an ADI image based on features of patterns. The semiconductor process machine learning module 200 may generate the second image from the features of the acceptable grids.

Figure 14:
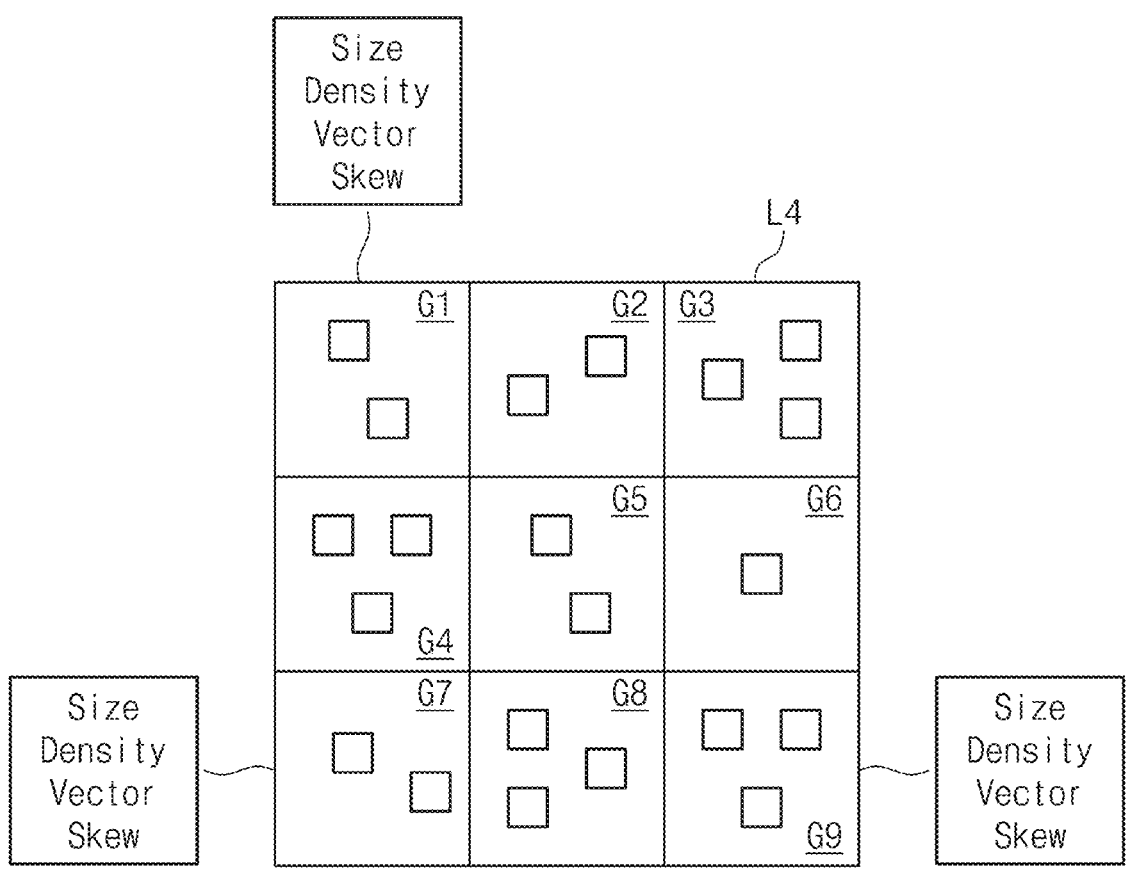
FIG. 14 illustrates an example in which features are tagged on grids of a fourth layout.

FIG. 14 illustrates an example in which features are tagged on grids of the fourth layout L4. Referring to FIG. 14, a feature of a size (or including a shape) of patterns, a feature of a density (or the number) of the patterns, a displacement feature of grids, a vector feature of an electric field of the grids, and a skew feature of the grids may be tagged on each of the grids. The semiconductor process machine learning module 200 may perform the machine learning-based inference based on the features of the grids.

Figure 15:
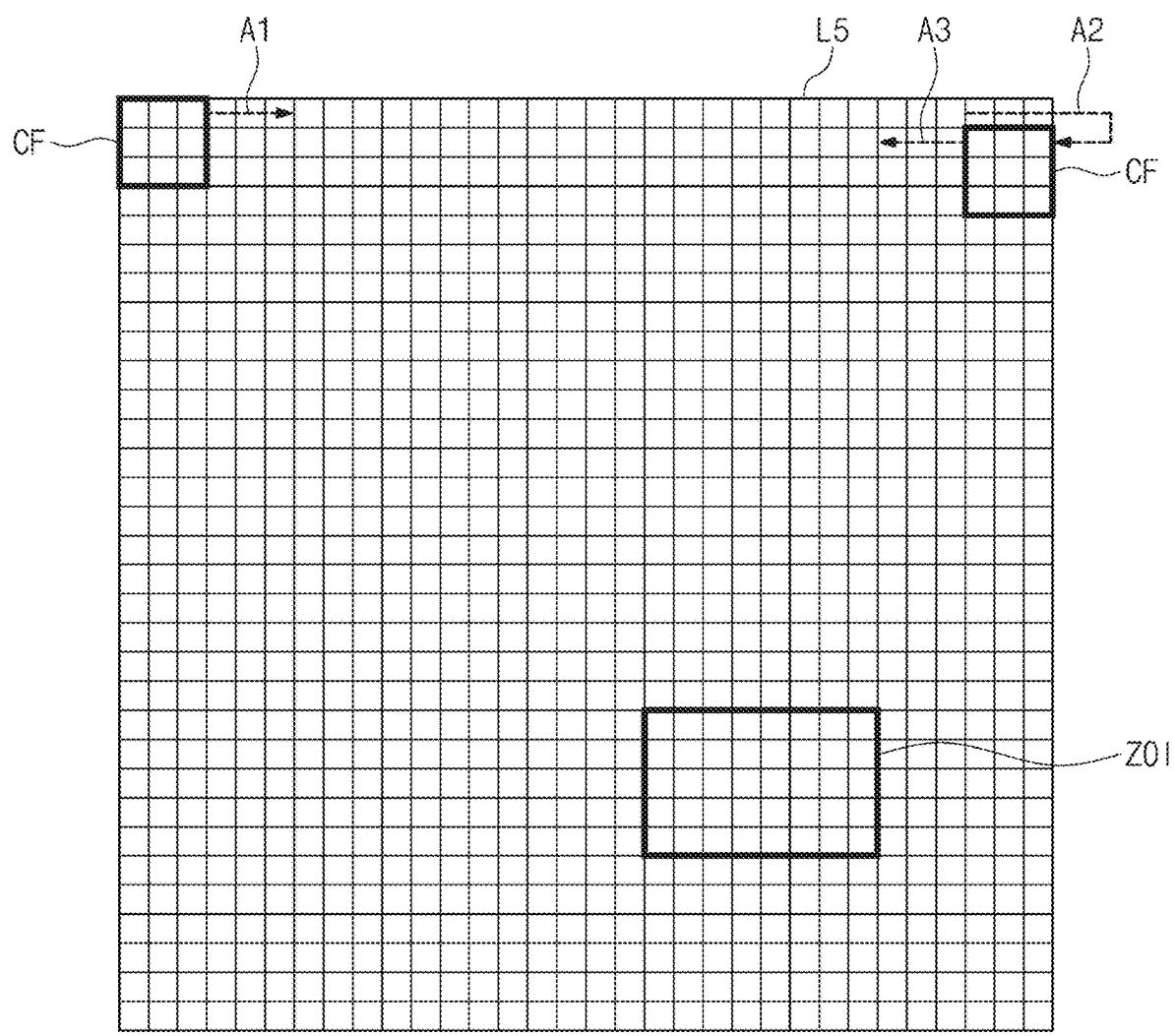
FIG. 15 illustrates an example of applying a convolution filter for extracting features from a fifth image of a long range.

FIG. 15 illustrates an example of applying a convolution filter for extracting features from a fifth image L5 of a long range. In an embodiment, the fifth image L5 may be divided into 36×36 grids. A size of a convolution filter CF may be determined by a process and a kind of a semiconductor device targeted for manufacturing. In FIG. 15, it is assumed that the size of the convolution filter CF is "3×3". However, the size of the convolution filter CF may be n×n (n being an integer more than 1 or a positive integer).

The convolution filter CF may extract features of an influence that is transferred to a selected grid from neighboring grids among grids overlaid by the convolution filter CF. For example, the selected grid may be a grid placed at the center of the convolution filter CF.

As marked by a first arrow A1, the convolution filter CF may move in a row direction with a stride of "1" or a stride of "j" (j being a positive integer). When the convolution filter CF reaches an end of a row, as marked by a second arrow A2, the convolution filter CF may move in a column direction with a stride of "1" or a stride of "k" (k being a positive integer). Afterwards, the convolution filter CF may move with a given stride in a direction facing away from the row direction.

While the convolution filter CF moves, features may be calculated from the convolution filter CF. The semiconductor process machine learning module 200 may extract features from the fifth image L5 by repeating the process of moving the convolution filter CF and calculating features.

Afterwards, the semiconductor process machine learning module 200 may infer an ACI image by performing the method of FIG. 13 based on the extracted features. When an ACI image experiencing the grid-based inference is acceptable, the semiconductor process machine learning module 200 may decide the inferred ACI image.

Alternatively or additionally, when the ACI image experiencing the grid-based inference is acceptable, the semiconductor process machine learning module 200 may additionally perform the pattern-based inference, which is described with reference to FIG. 6, on grids of a zone of interest ZOI. A corresponding grid of the grids of the ACI image inferred based on a grid may be updated based on the ACI image decided by the pattern-based inference performed in addition.

For example, the semiconductor process machine learning module 200 may further improve accuracy of a layout of the zone of interest ZOI by performing a 2-step inference on the zone of interest ZOI.

In some example embodiments, the pattern-based PPC described with reference to FIG. 6 may be performed on an image having a size of 1 um×1 um in consideration of a resource (e.g., a time, a power, and a computing power) necessary or preferred to perform computation. The grid-based PPC described with reference to FIG. 13 may be performed on an image including 100×100 grids each having a size of 1×1 um.

As described above, according to some example embodiments of inventive concepts, an inference is performed based on features of patterns affecting an etching process. The features of the patterns may include features inherent in each pattern and features of an influence from neighboring patterns. Accordingly, an accuracy of the PPC may be improved, and the amount of computation may decrease.

Alternatively or additionally, according to some example embodiments of inventive concepts, the PPC for a short-range image and the PPC for a long-range image may be selectively performed. Also, the PPC for a short-range image and the PPC for a long-range image may be complexly performed. Accordingly, the accuracy of the PPC may be improved, and an amount of computation may be improved, e.g. optimized.

In the above example embodiments, components according to inventive concepts are described by using the terms "first", "second", "third", and the like. However, the terms "first", "second", "third", and the like may be used to distinguish components from each other and do not necessarily limit inventive concepts. For example, the terms "first", "second", "third", and the like do not necessarily involve an order or a numerical meaning of any form.

In the above example embodiments, components according to some embodiments of inventive concept are described by using blocks and/or modules. The blocks may be implemented with various hardware devices, such as an integrated circuit, an application specific IC (ASCI), a field programmable gate array (FPGA), and a complex programmable logic device (CPLD), firmware driven in hardware devices, software such as an application, or a combination of a hardware device and software. Alternatively or additionally, the blocks and/or modules may include circuits implemented with semiconductor elements in an integrated circuit or circuits enrolled as intellectual property (IP).

According to some example embodiments, a machine learning-based inference is performed based on features of patterns, and a layout is generated with a result of the inference. A short-range inference and a long-range inference may be applied to perform the inference. Accordingly, a method and/or a computing device for generating a layout for manufacturing of a semiconductor device having improved reliability and/or a reduced amount of computation are provided.

While inventive concepts has been described with reference to some example embodiments thereof, it will be apparent to those of ordinary skill in the art that various changes and modifications may be made thereto without departing from the spirit and scope of the inventive concept as set forth in the following claims.

What is claimed is:

1. A method for fabricating of a semiconductor device, the method comprising:
    receiving a first layout including patterns for the fabrication of the semiconductor device;
    performing machine learning-based process proximity correction (PPC) based on features of patterns of the first layout to generate a second layout; and
    performing optical proximity correction (OPC) on the second layout to generate a third layout,
    wherein features of the patterns include a sum of position vectors of neighboring patterns, the neighboring patterns placed around a first pattern selected from the patterns, the neighboring patterns selected from the patterns.

2. The method of claim 1, wherein the features of the patterns include sizes of the patterns.

3. The method of claim 1, wherein the features of the patterns include displacement information associated with the patterns.

4. The method of claim 3, wherein the displacement information includes an influence that neighboring patterns exert on a selected pattern, wherein as a distance between the selected pattern and a neighboring pattern of the patterns increases, the influence that the neighboring pattern exerts on the selected pattern decreases.

5. The method of claim 4, wherein the decrease in the influence is based on a Gaussian distribution.

6. The method of claim 1, wherein the features of the patterns include information corresponding to an electric field applied to the patterns during an etching process.

7. The method of claim 6, wherein the electric field information includes the sum of position vectors of neighboring patterns, the neighboring patterns placed around the first pattern selected from the patterns, the neighboring patterns selected from the patterns.

8. The method of claim 7, wherein magnitudes of the position vectors decrease as a distance between a selected first pattern and the neighboring patterns increases.

9. The method of claim 8, wherein the decrease in the magnitudes of the position vectors is based on a Gaussian distribution.

10. The method of claim 1, wherein the features of the patterns include a skew associated with an etching process.

11. The method of claim 10, wherein the skew includes harmonics correcting angles of position vectors of neighboring patterns which are placed around a first pattern "m" times (m being a positive integer), the first pattern selected from among the patterns.

12. The method of claim 1, wherein the generating of the second layout includes:
    receiving an image of the first layout;
    extracting the features of the patterns from the image of the first layout; and
    performing a machine learning-based inference based on the features of the patterns to generate an image corresponding to an after cleaning inspection (ACI).

13. The method of claim 12, further comprising:
    adjusting the features based on a difference between the generated ACI image and the image of the first layout; and
    performing the machine learning-based inference based on the adjusted features to generate an adjusted ACI image.

14. The method of claim 12, wherein the generating of the ACI image includes:
    performing a first machine learning-based inference on the features, the first machine learning-based inference based on linear regression; and
    performing a second machine learning-based inference on a result of the first machine learning-based inference, the second machine learning-based inference based on nonlinear regression, on the result of the first machine learning-based inference.

15. A computing device comprising:
    processors, wherein at least one processor of the processors is configured to execute machine readable instructions that, when executed by the at least one processor, cause the computing device to perform generation of a layout for manufacturing of a semiconductor device,
    wherein the generation of the layout for the manufacturing of the semiconductor device includes,
    receiving a first layout including patterns for the manufacturing of the semiconductor device,
    wherein features of the patterns include a sum of position vectors of neighboring patterns, the neighboring patterns placed around a first pattern selected from the patterns, the neighboring patterns selected from the patterns,
    performing machine learning-based process proximity correction (PPC) based on features of the patterns of the first layout to generate a second layout, and
    performing optical proximity correction (OPC) on the second layout to generate the layout.

* * * * *